US012384187B2

(12) United States Patent
Hongu

(10) Patent No.: US 12,384,187 B2
(45) Date of Patent: Aug. 12, 2025

(54) IMAGE FORMING APPARATUS

(71) Applicant: CANON KABUSHIKI KAISHA, Tokyo (JP)

(72) Inventor: Shigeo Hongu, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/410,657

(22) Filed: Jan. 11, 2024

(65) Prior Publication Data

US 2024/0239127 A1 Jul. 18, 2024

(30) Foreign Application Priority Data

Jan. 13, 2023 (JP) ................................ 2023-003522

(51) Int. Cl.

| | |
|---|---|
| ***B42C 11/04*** | (2006.01) |
| ***B42C 1/12*** | (2006.01) |
| ***B42C 3/00*** | (2006.01) |
| ***G03G 15/00*** | (2006.01) |
| ***G03G 15/20*** | (2006.01) |

(52) U.S. Cl.

CPC ............... *B42C 11/04* (2013.01); *B42C 1/12* (2013.01); *G03G 15/2064* (2013.01); *G03G 15/5016* (2013.01); *G03G 15/5029* (2013.01); *G03G 15/5075* (2013.01); *B42C 3/00* (2013.01)

(58) Field of Classification Search

CPC .. B42C 11/04; B42C 1/12; B42C 3/00; G03G 15/2064; G03G 15/20; G03G 15/5029; G03G 15/00; G03G 15/5016; G03G 15/5075; G03G 15/6544

USPC .......... 412/9, 11, 13, 14, 18, 19, 25, 37, 901

See application file for complete search history.

(56) References Cited

U.S. PATENT DOCUMENTS

2016/0068363 A1* 3/2016 Kiriyama ............... B42C 19/02 412/11

FOREIGN PATENT DOCUMENTS

| | | |
|---|---|---|
| JP | 2005321478 A | 11/2005 |
| JP | 2008132728 A | 6/2008 |

* cited by examiner

*Primary Examiner* — Justin V Lewis

(74) *Attorney, Agent, or Firm* — Canon U.S.A., Inc. IP Division

(57) ABSTRACT

An image forming apparatus includes a fixing unit configured to form a nip portion and fix a toner image to a recording material, and a speed control unit configured to control a conveyance speed of a recording material in the nip portion, wherein, in a case where glue binding is not performed, a recording material having a first basis weight is conveyed at a second speed greater than a first speed, and a recording material having a second basis weight greater, in basis weight, than the recording material having the first basis weight is conveyed at the first speed, and wherein, in a case where the glue binding is performed, the recording material having the first basis weight and the recording material having the second basis weight are conveyed at the first speed.

6 Claims, 10 Drawing Sheets

FIG.5A

HIGH SPEED BALANCE TEMPERATURE CONTROL MODE
CONVEYANCE SPEED: 600 mm/s
PRIORITY 1

| BASIS WEIGHT LOWER LIMIT | BASIS WEIGHT UPPER LIMIT | HIGH QUALITY PAPER | COATED PAPER |
|---|---|---|---|
| 60 | 63 | 157 | |
| 64 | 79 | 166 | 166 |
| 80 | 105 | 171 | 171 |
| 106 | 128 | 171 | 184 |
| 129 | 150 | 182 | 184 |
| 151 | 180 | 182 | 184 |
| 181 | 209 | 182 | 184 |
| 210 | 220 | 182 | 184 |
| 221 | 256 | 182 | |
| 257 | 300 | | |
| 301 | 325 | | |
| 326 | 400 | | |
| 401 | 450 | | |
| 451 | 500 | | |

FIG.5B

LOW SPEED BALANCE TEMPERATURE CONTROL MODE
CONVEYANCE SPEED: 400 mm/s
PRIORITY 2

| BASIS WEIGHT LOWER LIMIT | BASIS WEIGHT UPPER LIMIT | HIGH QUALITY PAPER | COATED PAPER |
|---|---|---|---|
| 60 | 63 | 166 | |
| 64 | 79 | 166 | 156 |
| 80 | 105 | 166 | 156 |
| 106 | 128 | 166 | 166 |
| 129 | 150 | 166 | 166 |
| 151 | 180 | 166 | 166 |
| 181 | 209 | 166 | 166 |
| 210 | 220 | 166 | 166 |
| 221 | 256 | 166 | 166 |
| 257 | 300 | 166 | 176 |
| 301 | 325 | 166 | 181 |
| 326 | 400 | 166 | 181 |
| 401 | 450 | 166 | 181 |
| 451 | 500 | 166 | 181 |

FIG.5C

THICK PAPER TEMPERATURE CONTROL MODE
CONVEYANCE SPEED: 400 mm/s
PRIORITY 3

| BASIS WEIGHT LOWER LIMIT | BASIS WEIGHT UPPER LIMIT | HIGH QUALITY PAPER | COATED PAPER |
|---|---|---|---|
| 60 | 63 | 166 | |
| 64 | 79 | 166 | 156 |
| 80 | 105 | 166 | 156 |
| 106 | 128 | 171 | 181 |
| 129 | 150 | 181 | 181 |
| 151 | 180 | 181 | 181 |
| 181 | 209 | 181 | 181 |
| 210 | 220 | 181 | 181 |
| 221 | 256 | 181 | 181 |
| 257 | 300 | 181 | 181 |
| 301 | 325 | 181 | 181 |
| 326 | 400 | 181 | 181 |
| 401 | 450 | 181 | 181 |
| 451 | 500 | 181 | 181 |

FIG.5D

THIN PAPER TEMPERATURE CONTROL MODE
CONVEYANCE SPEED: 400 mm/s
PRIORITY 4

| BASIS WEIGHT LOWER LIMIT | BASIS WEIGHT UPPER LIMIT | HIGH QUALITY PAPER | COATED PAPER |
|---|---|---|---|
| 60 | 63 | 151 | |
| 64 | 79 | 151 | 151 |
| 80 | 105 | 151 | 151 |
| 106 | 128 | 151 | 151 |
| 129 | 150 | 151 | 151 |
| 151 | 180 | 151 | 151 |
| 181 | 209 | 151 | 166 |
| 210 | 220 | 151 | 166 |
| 221 | 256 | 151 | 166 |
| 257 | 300 | 166 | 176 |
| 301 | 325 | 166 | 181 |
| 326 | 400 | 166 | 181 |
| 401 | 450 | 166 | 181 |
| 451 | 500 | 166 | 181 |

FIG.7
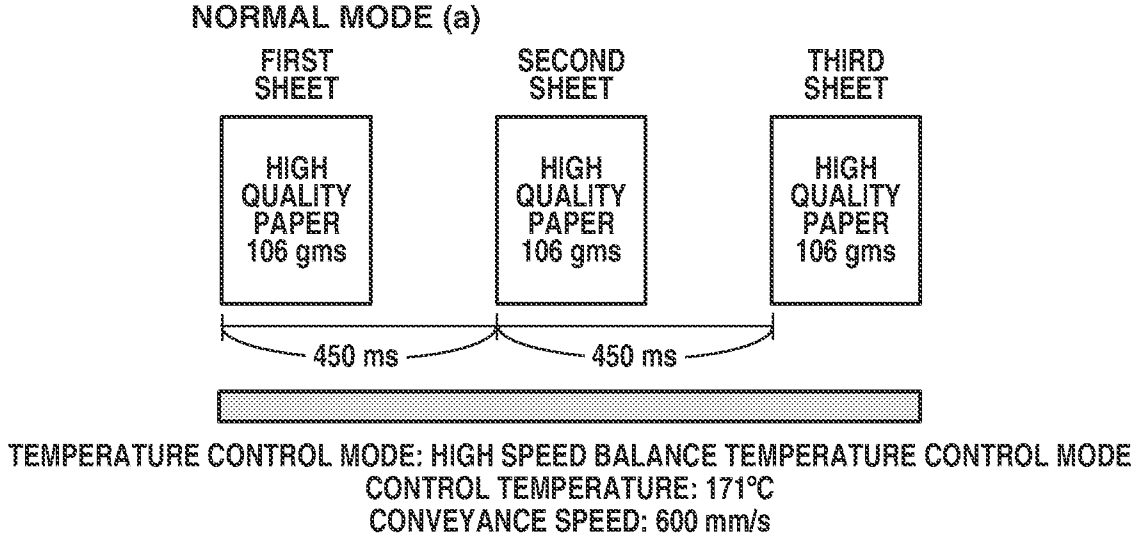
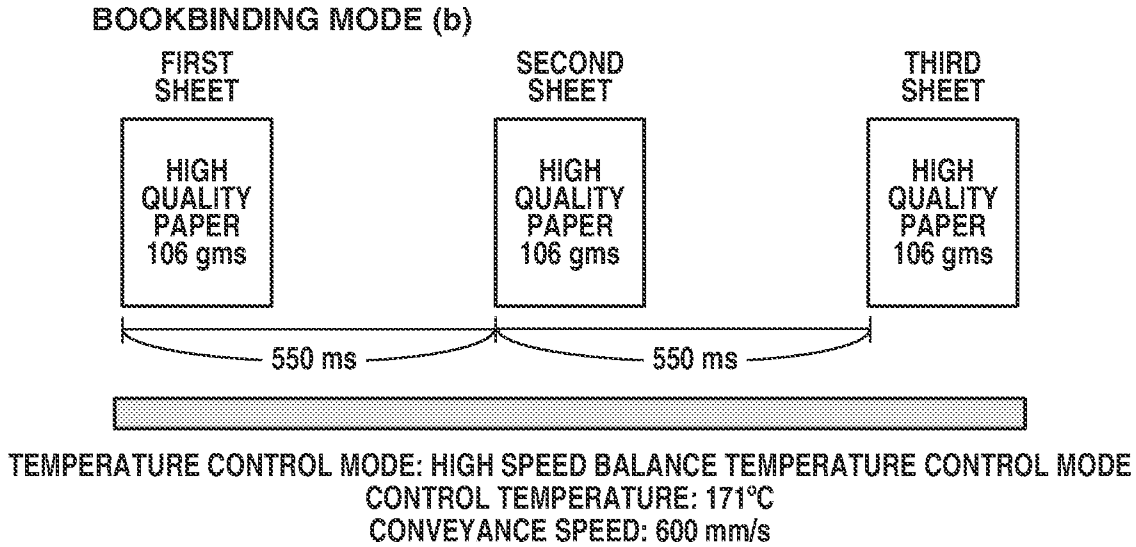

IMAGE FORMING APPARATUS

BACKGROUND

Field of the Disclosure

The present disclosure relates to an image forming apparatus that forms a toner image on a recording material and is provided with a bookbinding apparatus that binds the recording material.

Description of the Related Art

An image forming apparatus includes a fixing device that transfers a toner image onto a conveyed recording material and fixes an unfixed toner image on the recording material thereto.

A fixing device is known to have a configuration including a heating rotating member having a heating source for heating an unfixed toner image and a pressure roller that presses the heating rotating member (Japanese Patent Application Laid-Open No. 2005-321478). The fixing device also includes an abutting/separation mechanism that enables a pressure rotating member to move between a position where it abuts on the heating rotating member and a position where it separates from the heating rotating member. In a case where the pressure rotating member is in the position where it abuts on the heating rotating member, the heating rotating member and the pressure rotating member forms a nip portion. If a recording material carrying an unfixed toner image is conveyed to the nip portion, heat and pressure necessary for fixing are applied to the recording material in the nip portion, and the toner on the recording material is fixed.

In a case where a toner image is formed on a recording material, an amount of heat necessary for fixing the toner image is different depending on a type of recording material. Thus, a temperature of the heating rotating member is changed depending on the type of recording material. Accordingly, the amount of heat applied to the toner image on the recording material can be appropriately controlled.

If the amount of heat is changed to an optimum amount depending on the type of recording material, image quality of the toner image formed on the recording material will improve. On the other hand, if the temperature is changed for each recording material, productivity will decrease.

One of reasons for the decrease in productivity is that in a case where a basis weight of a recording material is large, the amount of heat necessary for fixing increases, so that it is necessary to reduce a conveyance speed of the recording material. Thus, in a case where a recording material having a large basis weight and a recording material having a small basis weight are mixed, a time to switch the conveyance speed occurs, which decreases the productivity.

Some image forming apparatuses can attach a post-processing apparatus thereto that performs post-processing such as glue binding on a recording material subjected to image forming.

Glue binding is to bind a booklet by accumulating a plurality of sheets of recording material discharged from an image forming apparatus as a content sheet accumulated bundle, applying an adhesive to an end portion of the content sheet accumulated bundle, and attaching a cover sheet, which is larger than the sheet of the content sheet accumulated bundle and forms an outside of the booklet, to cover the booklet (Japanese Patent Application Laid-Open No. 2008-132728).

In a case where glue binding is performed, an operation of wrapping content sheets with a cover sheet is performed. Thus, the content sheets are printed first and stacked on a stacking unit in an apparatus that performs glue binding. If the content sheets are stacked in the stacking unit at a high speed, toner transfer may occur between the stacked sheets in some cases. Thus, there is a risk that an image defect may occur in performing glue binding.

SUMMARY

Embodiments of the present disclosure are directed to an image forming apparatus that can perform glue binding and prevent toner transfer from occurring between content sheets.

According to embodiments of the present disclosure, an image forming apparatus includes a fixing unit configured to form a nip portion and fix a toner image to a recording material, and a speed control unit configured to control a conveyance speed of a recording material in the nip portion, wherein, in a case where glue binding in which bookbinding is performed by gluing a cover sheet and a content sheet and wrapping the content sheet with the cover sheet is not performed, a recording material having a first basis weight is conveyed at a second speed greater than a first speed, and a recording material having a second basis weight greater, in basis weight, than the recording material having the first basis weight is conveyed at the first speed, and wherein, in a case where the glue binding is performed, the recording material having the first basis weight and the recording material having the second basis weight are conveyed at the first speed.

Further features of the present disclosure will become apparent from the following description of exemplary embodiments with reference to the attached drawings.

BRIEF DESCRIPTION OF THE DRAWINGS

FIGS. 5A to 5D are tables representing relationships among basis weights, conveyance speeds, and fixing temperatures of recording materials.

FIG. 7 illustrates sheet feeding intervals in a normal mode and a bookbinding mode.

DESCRIPTION OF THE EMBODIMENTS

<Image Processing System>

Figure 1:
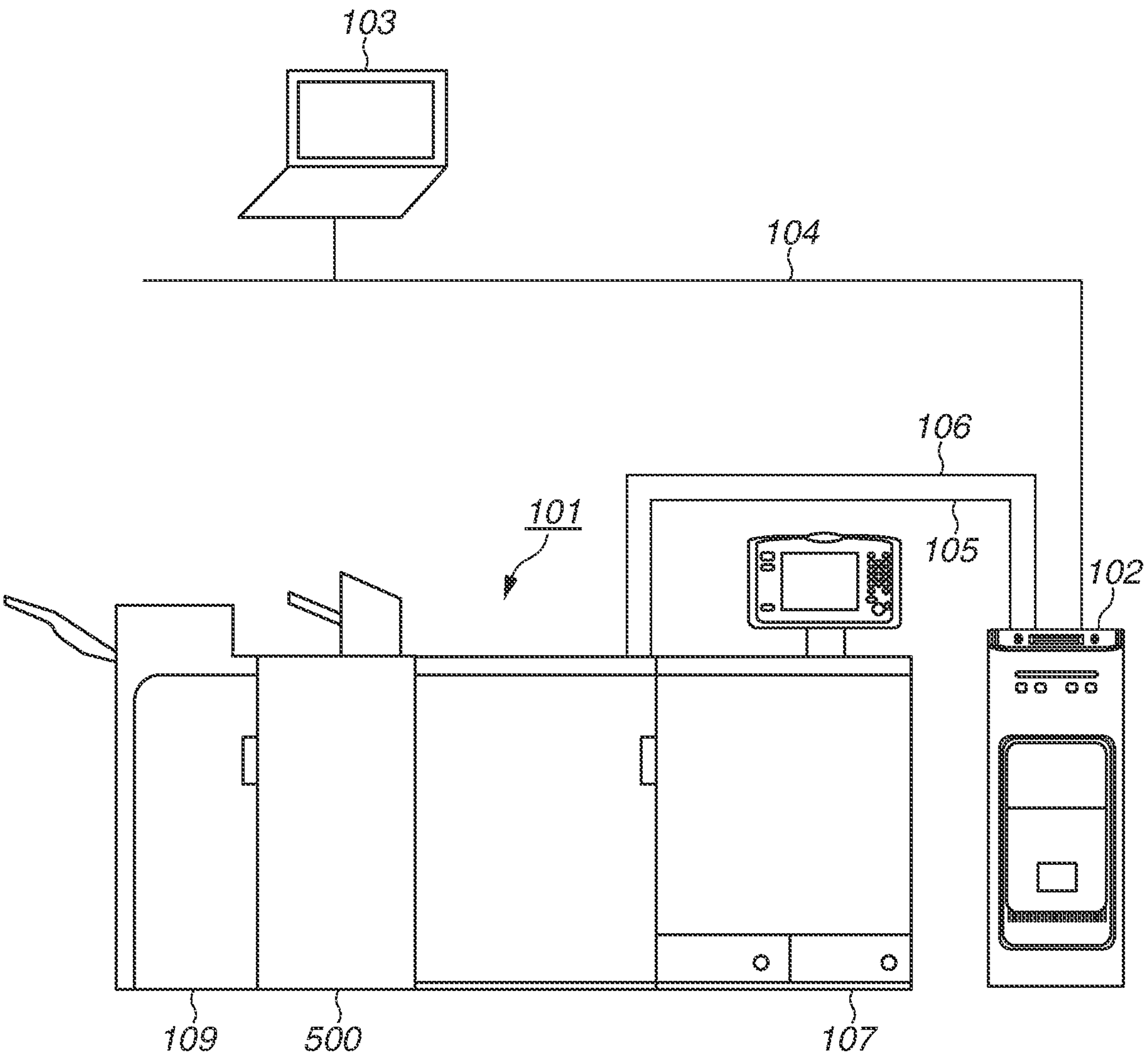
FIG. 1 is a schematic diagram illustrating an image forming system according to an exemplary embodiment of the present disclosure.

FIG. 1 is a schematic diagram illustrating an image forming system including an image forming apparatus 101 according to a first example of an exemplary embodiment. An image processing system includes the image forming apparatus 101 and an external controller 102. The image forming apparatus 101 is, for example, a multifunction peripheral (MFP).

The external controller 102 is, for example, an image processing controller, a digital front end (DFE), or a print server.

The image forming apparatus 101 and the external controller 102 are communicably connected via an internal local area network (LAN) 105 and a video cable 106. The external controller 102 is connected to a client personal computer (PC) 103 via an external LAN 104. The external controller 102 acquires a print instruction (a print job) from the client PC 103.

A printer driver is installed in the client PC 103 that has a function of converting image data into a print description language that can be processed by the external controller 102. A user can instruct printing via the printer driver using various applications.

The printer driver transmits image data to the external controller 102 based on a print job from a user. The external controller 102 receives the print job including the image data from the client PC 103, performs data analysis and rasterization processing, and instructs the image forming apparatus 101 to perform printing (image formation) based on the image data.

The image forming apparatus 101 is configured by connecting to a plurality of apparatuses having different functions, including a printing apparatus 107, and is capable of performing complex print processing such as bookbinding. The image forming apparatus 101 according to the present exemplary embodiment includes the printing apparatus 107, a glue binding apparatus 500, and a finisher 109. The printing apparatus 107 uses developer (for example, toner) to form an image on a recording material, which is fed from a sheet feeding unit provided at a lower part of a main body. The printing apparatus 107 forms yellow (Y), magenta (M), cyan (C), and black (K) images. A full-color image in which images of each color are superimposed is formed on the recording material. The recording material on which the image is formed is conveyed from the printing apparatus 107 to the finisher 109 via the glue binding apparatus 500. The finisher 109 stacks the recording material on which the image is formed.

The image processing system has a configuration in which the external controller 102 is connected to the image forming apparatus 101, but the external controller 102 is not always necessary. For example, the image forming apparatus 101 may be configured to directly acquire a print job including image data from the client PC 103 via the external LAN 104. In this case, the image forming apparatus 101 performs data analysis and rasterization processing, which are performed by the external controller 102. In other words, the image forming apparatus 101 and the external controller 102 may be integrally configured.

<System Configuration>

Figure 2:
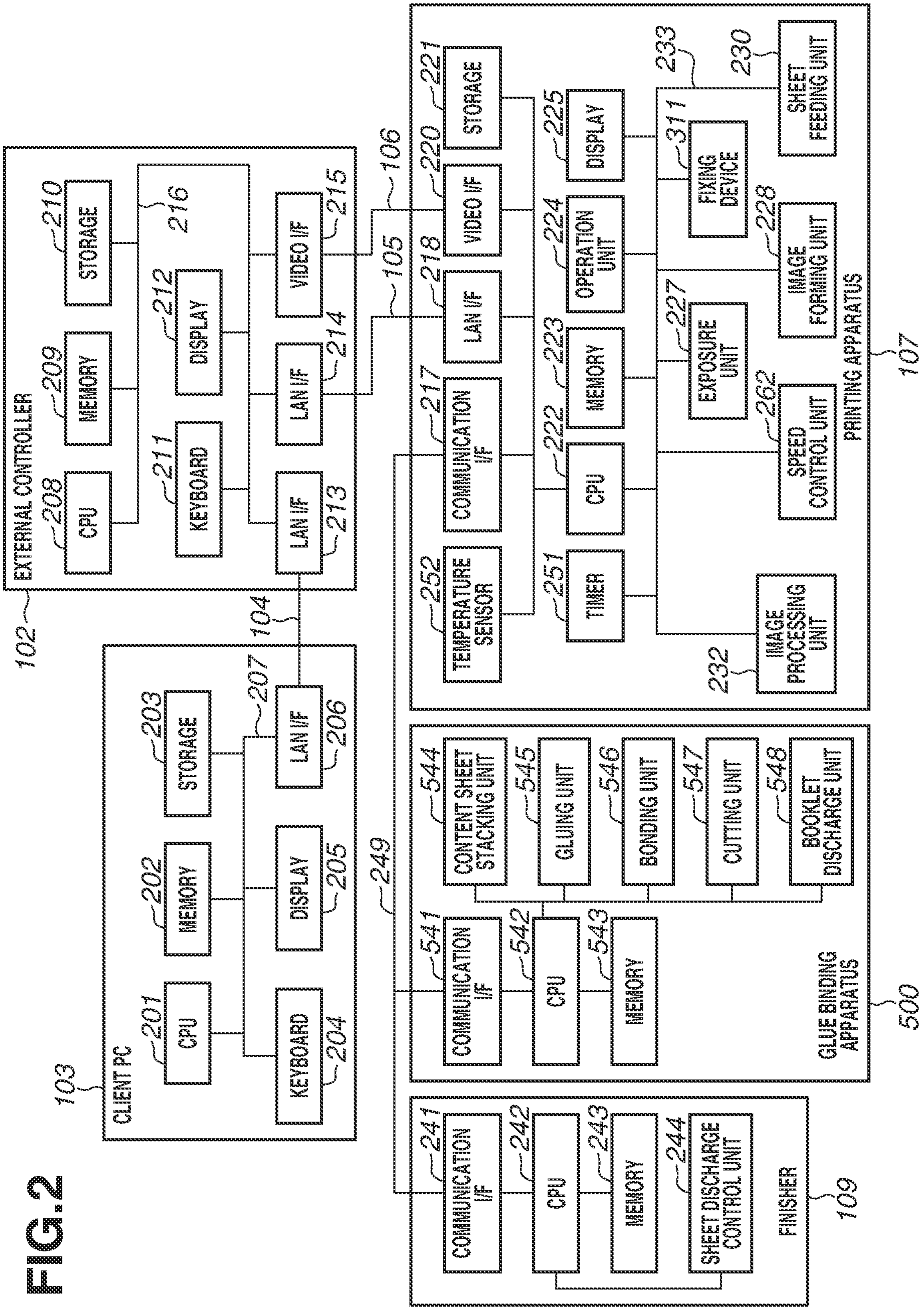
FIG. 2 is a configuration diagram illustrating the image forming system according to the present exemplary embodiment.

FIG. 2 is a system configuration diagram for controlling operations of the image forming system. Here, the printing apparatus 107, the glue binding apparatus 500, the finisher 109, the external controller 102, and the client PC 103 are each described.

<Printing Apparatus>

The printing apparatus 107 includes a communication interface (I/F) 217, a LAN I/F 218, and a video I/F 220 to communicate with other apparatuses. The printing apparatus 107 includes a central processing unit (CPU) 222, a memory 223, a storage 221, and an image processing unit 232 to control an operation of the printing apparatus 107. The printing apparatus 107 includes an exposure unit 227, an image forming unit 228, a fixing device 311, and a sheet feeding unit 230 to form an image. The printing apparatus 107 includes an operation unit 224 and a display 225 as user interfaces. The printing apparatus 107 includes a timer 251 and a temperature sensor 252 to adjust a correction value for optimally correcting geometric characteristics of images on front and back surfaces.

The geometric characteristics of the image include, for example, squareness and a printing position of the image with respect to the recording material. The above-described components are communicatively connected to each other via a system bus 233.

The communication I/F 217 is connected to the glue binding apparatus 500 and the finisher 109 via a communication cable 249 and controls communication with the glue binding apparatus 500 and the finisher 109. In a case where the printing apparatus 107 operates in cooperation with the glue binding apparatus 500 or the finisher 109, information and data are transmitted and received via the communication I/F 217. The LAN I/F 218 is connected to the external controller 102 via the internal LAN 105 and controls communication with the external controller 102. The printing apparatus 107 receives a print setting from the external controller 102 via the LAN I/F 218. The video I/F 220 is connected to the external controller 102 via the video cable 106 and controls communication with the external controller 102. The printing apparatus 107 receives image data representing an image to be formed from the external controller 102 via the video I/F 220.

The CPU 222 comprehensively controls image processing and printing by executing a computer program stored in the storage 221. The memory 223 provides a work area for the CPU 222 to execute various types of processing. In a case where image forming processing is performed, the CPU 222 controls the exposure unit 227, the image forming unit 228, the fixing device 311, and the sheet feeding unit 230.

The exposure unit 227 includes a photosensitive member, a charging wire for charging the photosensitive member, and a light source that exposes the photosensitive member charged by the charging wire with light to form an electrostatic latent image on the photosensitive member. The photosensitive member is, for example, a photosensitive belt, which is a belt-like elastic member with a photosensitive layer formed on its surface, or a photosensitive drum with a photosensitive layer formed on a cylinder surface. A charging roller may be used instead of the charging wire. The exposure unit 227 charges a surface of the photosensitive member to a uniform negative potential using the charging wire. The exposure unit 227 outputs laser light from the light source based on image data. The laser light scans the uniformly charged surface of the photosensitive member. Accordingly, potential of the photosensitive member changes at a position irradiated with the laser light, and an electrostatic latent image is formed on the surface. Four photosensitive members are provided corresponding to four colors of yellow (Y), magenta (M), cyan (C), and black (K). Electrostatic latent images corresponding to images of different colors are respectively formed on the four photosensitive members.

The image forming unit 228 transfers a toner image formed on the photosensitive member to the recording material. The image forming unit 228 includes a developing device, a transfer unit, and a toner replenishment unit. The developing device forms a toner image by adhering negatively charged toner from a developing cylinder to the electrostatic latent image formed on the surface of the photosensitive member.

Four developing devices are provided corresponding to four colors of yellow (Y), magenta (M), cyan (C), and black (K). The developing device visualizes the electrostatic latent image on the photosensitive member using toner of corresponding color.

The transfer unit includes an intermediate transfer belt 308 and transfers the toner image from the photosensitive member to the intermediate transfer belt 308. A primary transfer roller is provided at a position facing the photosensitive member with the intermediate transfer belt 308 in between. The primary transfer roller is applied with a positive potential, so that the toner image is transferred from each of the four photosensitive members onto the intermediate transfer belt 308 and superimposed on one another. Accordingly, a full-color toner image is formed on the intermediate transfer belt 308. The toner image formed on the intermediate transfer belt 308 is transferred to the recording material by a secondary transfer roller described below. The secondary transfer roller is applied with a positive potential, so that the full-color toner image is transferred from the intermediate transfer belt 308 to the recording material.

The fixing device 311 fixes the transferred toner image on the recording material. The fixing device 311 includes a heater and a roller pair. The fixing device 311 applies heat and pressure to the toner image on the recording material using the heater and the roller pair to melt and fix the toner image on the recording material. Accordingly, a product with the image formed on the recording material is generated. The sheet feeding unit 230 includes a conveyance roller and various sensors on a conveyance path to control a feeding operation of the recording material.

The operation unit 224 is an input device that receives inputs of various settings and an operation instruction from a user. The operation unit 224 includes, for example, various input keys and a touch panel. The display 225 is an output device that displays setting information of the image forming apparatus 101 and a processing status (status information) of a print job.

The timer 251 counts a time. The CPU 222 acquires current date and time from a count value of the timer 251. The temperature sensor 252 measures a temperature inside the printing apparatus 107. The CPU 222 acquires the temperature inside the printing apparatus 107, which is one of environmental conditions, from a measurement result of the temperature sensor 252. Humidity may be acquired as the environmental condition in addition to the temperature.

<Glue Binding Apparatus>

The glue binding apparatus 500 performs, for example, glue binding on the product output from the printing apparatus 107. The glue binding apparatus 500 includes a communication I/F 541, a CPU 542, a memory 543, a content sheet stacking unit 544, a gluing unit 545, a bonding unit 546, a cutting unit 547, and a booklet discharge unit 548. The communication I/F 541 is connected to the printing apparatus 107 via the communication cable 249 and controls communication with the printing apparatus 107. In a case where the glue binding apparatus 500 operates in cooperation with the printing apparatus 107, information and data are transmitted and received via the communication I/F 541. The CPU 542 executes a control program stored in the memory 543 to perform various types of control necessary for glue binding processing. The memory 543 stores the control program. The memory 543 also provides a work area for the CPU 542 to execute various types of processing. The content sheet stacking unit 544 stacks the conveyed recording material and generates a sheet bundle based on an instruction from the CPU 542. The gluing unit 545 applies glue to the bundle stacked in the content sheet stacking unit 544 based on an instruction from the CPU 542. The bonding unit 546 bonds the stacked bundle glued in the gluing unit 545 and a cover sheet based on an instruction from the CPU 542. After bonding the cover sheet, the cutting unit 547 cuts in three directions other than a glued surface to align booklet end faces based on an instruction from the CPU 542. The booklet discharge unit 548 discharges a completed booklet based on an instruction from the CPU 542.

<Finisher>

The finisher 109 executes, for example, stapling processing on the product output from the printing apparatus 107. The finisher 109 includes a communication I/F 241, a CPU 242, a memory 243, and a sheet discharge control unit 244. The communication I/F 241 is connected to the printing apparatus 107 via the communication cable 249 and controls communication with the printing apparatus 107. In a case where the finisher 109 operates in cooperation with the printing apparatus 107, information and data are transmitted and received via the communication I/F 241. The CPU 242 executes a control program stored in the memory 243 to perform various types of control necessary for sheet discharge. The memory 243 stores the control program. The memory 243 also provides a work area for the CPU 242 to execute various types of processing. The sheet discharge control unit 244 discharges the conveyed recording material based on an instruction from the CPU 242.

<External Controller>

The external controller 102 includes a LAN I/F 213, a LAN I/F 214, and a video I/F 215 to communicate with other apparatuses. The external controller 102 includes a CPU 208, a memory 209, and a storage 210 to control an operation of the external controller 102. The external controller 102 includes a keyboard 211 and a display 212 as user interfaces. These components are communicatively connected to each other via a system bus 216.

The LAN I/F 213 is connected to the client PC 103 via the external LAN 104 and controls communication with the client PC 103. The external controller 102 acquires a print job from the client PC 103 via the LAN I/F 213. The LAN I/F 214 is connected to the printing apparatus 107 via the internal LAN 105 and controls communication with the printing apparatus 107. The external controller 102 transmits the print setting to the printing apparatus 107 via the LAN I/F 214. The video I/F 215 is connected to the printing apparatus 107 via the video cable 106 and controls communication with the printing apparatus 107. The external controller 102 transmits image data to the printing apparatus 107 via the video I/F 215.

The CPU 208 executes a computer program stored in the storage 210 to comprehensively perform processing such as receiving image data transmitted from the client PC 103, raster image processor (RIP) processing, and transmitting image data to the image forming apparatus 101. The memory 209 provides a work area for the CPU 208 to execute various types of processing. The keyboard 211 is an input device that receives inputs of various settings and an operation instruction from a user. The display 212 is an output device that displays information about an application executed in the external controller 102 in a still image and a moving image.

<Client PC>

The client PC 103 includes a CPU 201, a memory 202, a storage 203, a keyboard 204, a display 205, and a LAN I/F 206. These components are communicatively connected to each other via a system bus 207.

The CPU 201 executes a computer program stored in the storage 203 to control an operation of the client PC 103. According to the present exemplary embodiment, the CPU 201 generates image data and transmits a print job. The memory 202 provides a work area for the CPU 201 to execute various types of processing. The keyboard 204 and the display 205 are user interfaces. The keyboard 204 is an input device that receives an instruction from a user. The display 205 is an output device that displays information about an application executed in the client PC 103 in a still image and a moving image. The LAN I/F 206 is connected to the external controller 102 via the external LAN 104 and controls communication with the external controller 102. The client PC 103 transmits a print job including image data to the external controller 102 via the LAN I/F 206.

The external controller 102 and the image forming apparatus 101 are connected using the internal LAN 105 and the video cable 106, but it is sufficient that a configuration can transmit and receive data necessary for printing, and for example, only the video cable 106 may be used for connection. The memories 202, 209, 223, and 243 may each be a storage device for storing data and a program. The memories can include, for example, a volatile random access memory (RAM), a non-volatile read only memory (ROM), a storage, and a Universal Serial Bus (USB) memory.

<Configuration of Image Forming Apparatus>

Figure 3:
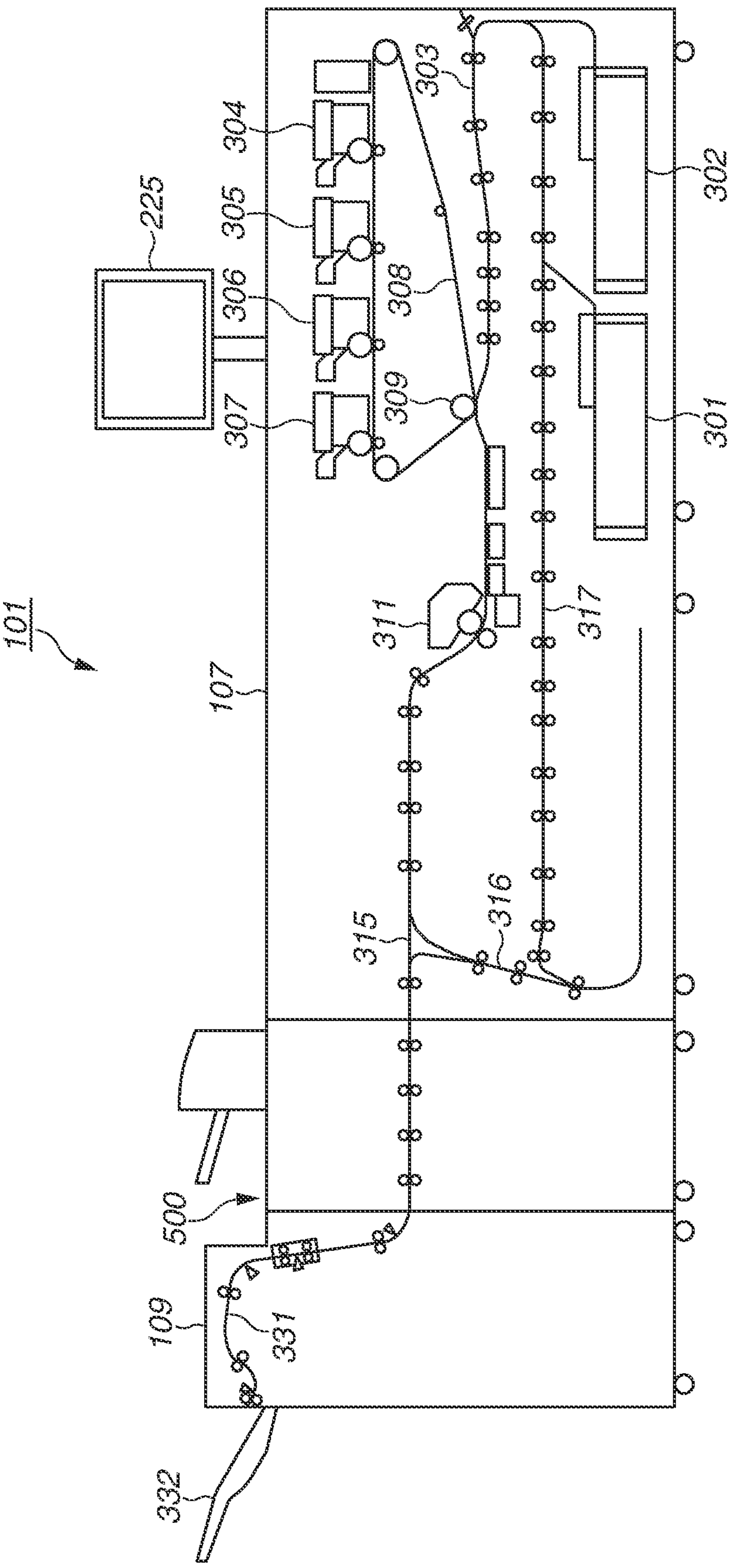
FIG. 3 is a schematic diagram illustrating an image forming apparatus according to the present exemplary embodiment.

FIG. 3 is a schematic diagram illustrating the image forming apparatus 101. The display 225 is provided above the printing apparatus 107. The display 225 displays a print status and information for a setting of the image forming apparatus 101. A recording material (product) on which an image is formed in the printing apparatus 107 is conveyed to the glue binding apparatus 500 and the finisher 109 provided at subsequent stages.

The printing apparatus 107 includes a plurality of sheet feeding decks 301 and 302 and a conveyance path 303 as the sheet feeding unit 230. Each of the sheet feeding decks 301 and 302 can store different types of recording materials. Information about the stored recording material (a basis weight, a type of recording material, and the like) can be detected on the apparatus side, and according to the present exemplary embodiment, a user can set the information from the display 225.

A topmost sheet of the recording materials stored in each of the sheet feeding decks 301 and 302 is separated and fed to the conveyance path 303. The printing apparatus 107 includes image forming units 304, 305, 306, and 307 that form images as the exposure unit 227. The printing apparatus 107 forms a color image. Thus, the image forming unit 304 forms a black (K) image (toner image). The image forming unit 305 forms a cyan (C) image (toner image). The image forming unit 306 forms a magenta (M) image (toner image). The image forming unit 307 forms a yellow (Y) image (toner image).

The printing apparatus 107 includes the intermediate transfer belt 308 on which the toner images are transferred from the respective image forming units 304, 305, 306, and 307 and a secondary transfer roller 309 as the image forming unit 228.

The intermediate transfer belt 308 rotates clockwise in FIG. 3, and the toner images are superimposed and transferred thereto in the order of the image forming units 307, 306, 305, and 304. Accordingly, a full-color toner image is formed on the intermediate transfer belt 308. The intermediate transfer belt 308 rotates to convey the toner image to the secondary transfer roller 309. The recording material is conveyed to the secondary transfer roller 309 while matching a timing with conveyance of the toner image to the secondary transfer roller 309. The secondary transfer roller 309 transfers the toner image on the intermediate transfer belt 308 to the conveyed recording material.

The printing apparatus 107 includes the fixing device 311. The fixing device 311 fixes the toner image to the recording material. Thus, the fixing device 311 includes a heating rotating member and a pressure rotating member. Heat and pressure are applied to the recording material as it passes through a nip portion N formed by the heating rotating member and the pressure rotating member. Then, the toner image is melted and pressed to a first surface of the recording material.

The recording material passing through the fixing device 311 is guided to a conveyance path 315. In a case where double-sided printing is instructed, an image is also formed on a back surface (second surface). Thus, the recording material is guided to a reversing path 316. The recording material conveyed to the reversing path 316 has its conveyance direction reversed in the reversing path 316 and is conveyed to a double-sided printing conveyance path 317. The recording material is reversed from front to back by switchback conveyance through the reversing path 316 and the double-sided printing conveyance path 317. The recording material is conveyed through the double-sided printing conveyance path 317 to the conveyance path 303, and passes through the secondary transfer roller 309 and the fixing device 311, so that an image is formed on the second surface different from the first surface.

In a case where single-sided printing is performed or a case where images are formed on both sides in double-sided printing, the recording material is conveyed to the conveyance path 315 and transferred to the glue binding apparatus 500.

The glue binding apparatus 500 receives a plurality of sheets of the recording materials after image formation from the printing apparatus 107 and performs bookbinding processing thereon. Bookbinding processing is described below. In a case where bookbinding processing is not performed on the received recording material, the glue binding apparatus 500 conveys the received recording material as it is to the finisher 109.

The finisher 109 can stack the recording material conveyed from the glue binding apparatus 500. The finisher 109 includes a conveyance path 331 and a stack tray 332 on which the recording material is stacked. The recording material conveyed from the printing apparatus 107 is stacked on the stack tray 332 via the conveyance path 331.

<Operation of Fixing Device>

Figure 4:
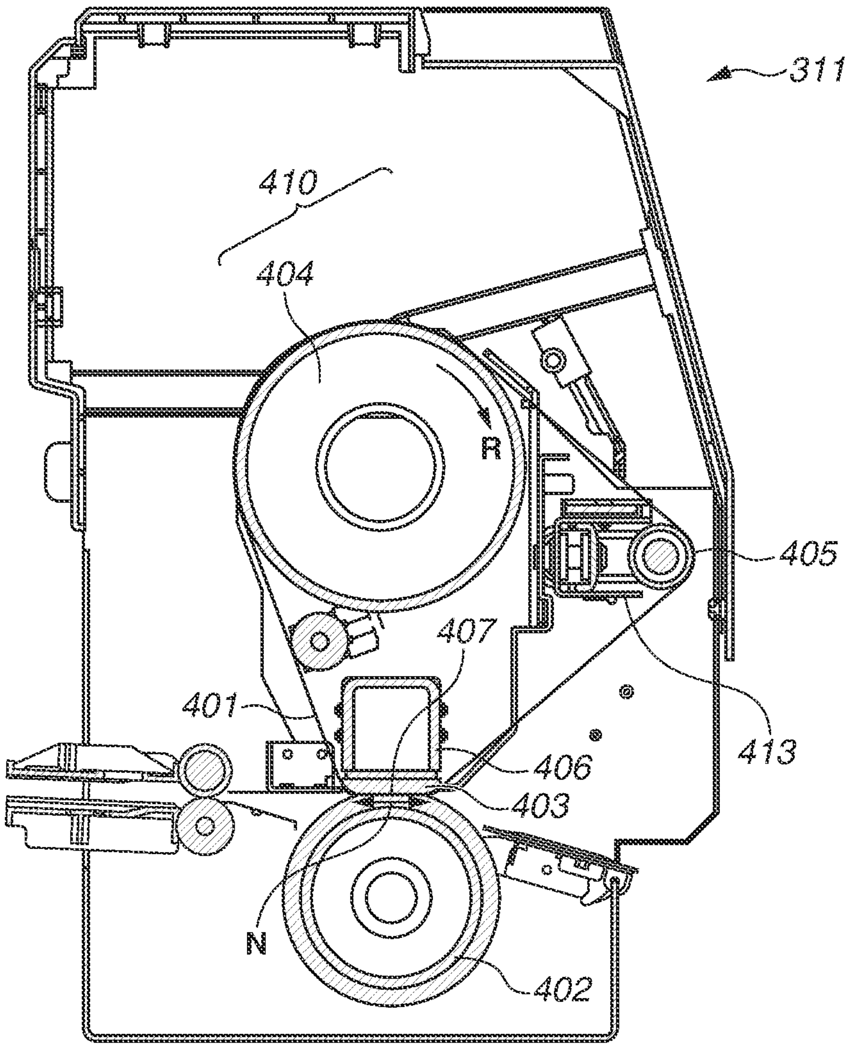
FIG. 4 is a schematic diagram illustrating a fixing device according to the present exemplary embodiment.

Next, a configuration of the fixing device 311 according to the present exemplary embodiment is described in detail with reference to FIG. 4. FIG. 4 is a cross-sectional view of the fixing device 311 according to the present exemplary embodiment. In FIG. 4, a recording material is conveyed from right to left on the page. The fixing device 311 includes a heating unit 410 that includes a heat source and a pressure rotating member (hereinbelow referred to as a pressure roller) 402 that forms the nip portion N together with the heating unit 410. The heating unit 410 includes a fixing belt (hereinbelow referred to as a belt) 401 as an endless rotatable heating rotating member, a pad member (hereinbelow referred to as a pad) 403 as a fixing member, a heating roller 404, and a steering roller 405.

The belt 401 has thermal conductivity and heat resistance, and has a thin cylindrical shape. According to the present exemplary embodiment, the belt 401 has a three-layer structure including a base layer, an elastic layer formed around an outer periphery of the base layer, and a mold releasable layer formed around an outer periphery of the elastic layer. The base layer has a thickness of 60 μm and is made of a polyimide (PI) resin, the elastic layer has a thickness of 300 μm and is made of silicone rubber, and the mold releasable layer has a thickness of 30 μm and is made of a tetrafluoroethylene perfluoroalkoxyethylene copolymer resin (PFA) as a fluorine resin. The belt 401 is stretched around the pad 403, the heating roller 404, and the steering roller 405.

The pad 403 is a member that is brought into pressure contact with the pressure roller 402 via the belt 401 to form the nip portion N with a predetermined width in the conveyance direction of the recording material. The pad 403 has a nearly rectangular cross section and is a long member along a width direction of the belt 401. A material for the pad 403 is required to be heat resistant, so that a liquid crystal polymer (LCP) resin is used.

A sliding sheet 407 of which a surface is coated with polytetrafluoroethylene (PTFE) and silicone oil S (hereinbelow referred to as oil S) as a lubricant are interposed between the pad 403 and the belt 401 so that the belt 401 slides smoothly against the pad 403.

The sliding sheet 407 is formed by coating a surface of a 70 μm thick polyimide base material with PTFE. The sliding sheet 407 is arranged to improve slidability of the pad 403 and the belt 401 and can be substituted by applying a coating or the like to the surface layer of the pad 403 to improve the slidability.

A stay 406 is arranged inside the belt 401. The stay 406 is arranged on an opposite side of the pad 403 from the sliding sheet 407. The stay 406 is a reinforcing member that is long in the width direction of the belt 401 and has rigidity to back up the pad 403. The stay 406 is made of stainless steel SUS304 drawn material with a wall thickness of 3 mm and is formed into a hollow shape having a square shaped cross section to ensure strength. The stay 406 gives strength to the pad 403 and secures a pressing force at the nip portion N if the pad 403 is pressed by the pressure roller 402. The material of the stay 406 is not limited to stainless steel as long as its strength can be ensured.

The heating roller 404 is a stainless steel pipe with a thickness of 1 mm in which a halogen heater (not illustrated) is installed and can generate heat up to a predetermined temperature. The belt 401 is heated by the heating roller 404 and controlled to a fixing temperature corresponding to a paper type based on temperature detection by a thermistor. The thermistor is not limited to detecting a surface temperature of the heating roller 404, but may also detect a surface temperature of the belt 401. The heating roller 404 may be configured to be driven to rotate. The heating roller 404 is driven to rotate, so that it is possible to increase a tension of the belt 401 from the nip portion N to the heating roller 404 in a belt rotation direction.

In this way, curvature of an exit of the nip portion N can be increased in the belt rotation direction, and separation performance of a recording material P can be improved. The fixing temperature according to the present exemplary embodiment refers to the surface temperature of the heating roller 404, but is not limited thereto. The fixing temperature may be the temperature of the heating roller 404 detected by the thermistor, or may be the temperature of the belt 401.

The steering roller 405 suspends the belt 401 and is supported by a steering frame 413. As the steering frame 413 rotates, the steering roller 405 changes its alignment with respect to other suspension members. Accordingly, a tension difference is generated front and back of the belt 401, and the position of the belt 401 is controlled in the width direction of the belt 401. The steering roller 405 is biased by a spring supported by the steering frame 413 and also functions as a tension roller that applies a predetermined tension to the belt 401.

The pressure roller 402 is a roller with an elastic layer formed around an outer periphery of a shaft and a mold releasable layer formed around an outer periphery of the elastic layer. The shaft is made of stainless steel, the elastic layer has a thickness of 5 mm and is made of conductive silicone rubber, and the mold releasable layer has a thickness of 50 μm and is made using PFA as a fluorine resin. The pressure roller 402 is axially supported by a frame of the fixing device 311, a gear is fixed to one end, and the pressure roller 402 is connected to a drive source M via the gear and driven to rotate. The belt 401 is followingly rotated in an R direction by being pinched between the rotating pressure roller 402 and the pad 403.

In this way, the pad 403, the heating roller 404, and the steering roller 405 are arranged on an inner peripheral surface of the belt 401 and suspend the belt 401 thereon. The belt 401 is pinched between the pressure roller 402 and the pad 403 and is followingly rotated as the pressure roller 402 rotates. The belt 401 stores heat from the heating roller 404. The recording material carrying an unfixed toner image is pinched and conveyed in the nip portion N by the pressure roller 402 and the belt 401, and is applied with heat and pressure necessary for fixing. Then, the toner image is fixed on the recording material P.

<Relationship between Basis Weight and Conveyance Speed>

The image forming apparatus 101 according to the present exemplary embodiment can convey the recording material at a plurality of speeds including a first speed and a second speed as conveyance speeds when the recording material passes through the secondary transfer roller 309 and the fixing device 311. The image forming apparatus 101 according to the present exemplary embodiment includes a speed control unit 262 that controls the conveyance speed. According to the present exemplary embodiment, the first speed is a low speed of 400 mm/s, and the second speed is a high speed of 600 mm/s. Two speeds are described here as examples, but the recording material may be conveyed at three or more speeds.

The image forming apparatus 101 according to the present exemplary embodiment can form an image on recording materials having a large basis weight and a small basis weight. Here, a recording material having a small basis weight is referred to as a recording material having a first basis weight, and a recording material having a large basis weight is referred to as a recording material having a second basis weight.

A reason why a recording material is conveyed at a plurality of speeds according to the present exemplary embodiment is described. As the basis weight of the recording material increases, heat capacity of the recording material increases. As the basis weight of the recording material increases, an amount of heat necessary to fix a toner image increases. As the conveyance speed of the recording material is higher, a time during which the recording material is applied with heat in the nip portion N becomes shorter. Thus, if a recording material having a large basis weight is conveyed at a high speed, fixability may not be guaranteed in some cases. Accordingly, in order to ensure the fixability of the recording material having the large basis weight, in addition to the high conveyance speed, the low conveyance speed is used. Further, in order to ensure high image quality, it is necessary to increase a time length for applying heat to the recording material in the nip portion N.

At the high speed of 600 mm/s (the second speed), only some recording materials, such as the recording material having the first basis weight, which is a small basis weight, can satisfy a certain image quality. Thus, the image forming apparatus 101 has the low conveyance speed of 400 mm/s (the first speed), and can satisfy a certain image quality with respect to the recording material having the second basis weight, which is a large basis weight. Further, the image forming apparatus 101 achieves certain fixability and image quality by changing the conveyance speed and the fixing temperature (setting temperature) for each recording material. The image forming apparatus 101 can receive page information from the external controller 102 before feeding the sheet. The information includes the sheet feeding deck in which the recording material to be fed is stored, a size of the recording material, the recording material type (coated paper, embossed paper, etc.), the basis weight of the recording material, and whether it is a last page of a job. Further, the conveyance speed and the fixing temperature are determined based on the basis weight. According to the present exemplary embodiment, if the basis weight is determined, the conveyance speed and the fixing temperature are determined, but the conveyance speed and the fixing temperature may be determined using a different method. For example, the conveyance speed and a fixing speed may be determined based on the recording material size and the recording material type. Here, the high conveyance speed is 600 mm/s, and the low conveyance speed is 400 mm/s, but other speeds may be used. Further, three or more speeds may be used for the conveyance speed.

In a case where a job in which the recording material having the small basis weight and the recording material having the large basis weight are mixed is executed, the conveyance speed is changed every time the basis weight of the recording material varies, so that there is a possibility that the number of sheets to be printed per unit time (productivity) may be reduced due to a time required to switch the conveyance speed. Specifically, in a case where the basis weight of the recording material is changed from the small one to the large one, the conveyance speed of the recording material needs to be changed from high speed to low speed in order to ensure the fixability. Approximately 30 seconds are required to switch the conveyance speed. Thus, the time required to switch the conveyance speed will be downtime.

<Fixing Temperature Control Mode>

The fixing device 311 according to the present exemplary embodiment has a plurality of types of temperature control modes. A reason for having the plurality of temperature control modes is as follows. If recording materials of various basis weights are fixed at the same temperature, there is no need to have a plurality of types of temperature control modes. However, if recording materials of various basis weights are fixed at the same temperature, there is a risk of insufficient heat or excessive heat being applied.

The fixing device 311 according to the present exemplary embodiment can be switched to a plurality of types of temperature control modes.

The fixing device 311 has balance temperature control modes (a) and (b) that prioritize productivity of paper having a basis weight between thin paper and thick paper, a thick paper temperature control mode (c) that prioritizes productivity of thick paper, and a thin paper temperature control mode (d) that prioritizes productivity of thin paper.

FIGS. 5A to 5D illustrate fixing temperatures (temperature tables) according to a corresponding basis weight gms range and types of recording materials, such as high quality paper and coated paper, for each temperature control mode according to the present exemplary embodiment. FIGS. 5A to 5D respectively illustrate temperature tables of a high speed balance temperature control mode (a), a low speed balance temperature control mode (b), a thick paper temperature control mode (c), and a thin paper temperature control mode (d) with respect to the two types of conveyance speeds described above. In each temperature control mode, a temperature ° C. corresponding to the type of recording material is set with respect to the basis weight range of the recording material. The CPU 222 refers to the temperature table of the selected temperature control mode and changes the temperature of the heating rotating member of the fixing device 311 according to the basis weight and type of the recording material subjected to fixing.

As a specific example, here, paper having a basis weight of 52 to 105 gms is defined as thin paper, paper having a basis weight of 106 to 220 gms is defined as plain paper, and paper having a basis weight of 221 to 350 gms is defined as thick paper. According to the present exemplary embodiment, the temperature is the same in the range of plain paper at the fixing speeds of the respective balance temperature control modes (a) and (b), and the temperature is the same in the range of thin paper in the thin paper temperature control mode (d). Similarly, the temperature is the same in the range of thick paper in the thick paper temperature control mode (c). The range in which fixing can be performed at the same temperature is changed rather than the temperature is changed according to the temperature control mode. Accordingly, productivity can be improved corresponding to the basis weight.

For example, in a case where fixing is performed in the thin paper temperature control mode on a job in which recording materials of 64 gms and 106 gms, which are defined as thin paper, are mixed, fixing is performed at the same temperature. However, in a case of the thick paper temperature control mode (c), a temperature of a belt 401 needs to be changed from 166° C. to 171° C. Thus, in a job in which recording materials of 64 gms and 106 gms are mixed, the productivity is higher to perform fixing in the thin paper temperature control mode (d) than in the thick paper temperature control mode (c). In other words, in a case of a job in which recording materials having a predetermined basis weight or less are mixed, it is more productivity to perform fixing in the thin paper temperature control mode (d) than in the thick paper temperature control mode (c). Similarly, in a case where fixing is performed in the thick paper temperature control mode (c) on a job in which recording materials of 221 gms and 257 gms, which are defined as thick paper, are mixed, fixing is performed at the same temperature. However, in a case of the thin paper temperature control mode (d), the temperature of the belt 401 needs to be changed from 151° C. to 166° C. Since the temperature of the belt 401 needs to be changed in this way, image formation may have to be interrupted in some cases. Thus, in a job in which recording materials of 221 gms and 257 gms are mixed, productivity tends to be higher to perform fixing in the thick paper temperature control mode (c) than in the thin paper temperature control mode (d). In other words, in a case of a job in which recording materials having a predetermined basis weight or more are mixed, it is more productivity to perform fixing in the thick paper temperature control mode (c) than in the thin paper temperature control mode (d).

<Operation of Glue Binding Apparatus>

Figure 6:
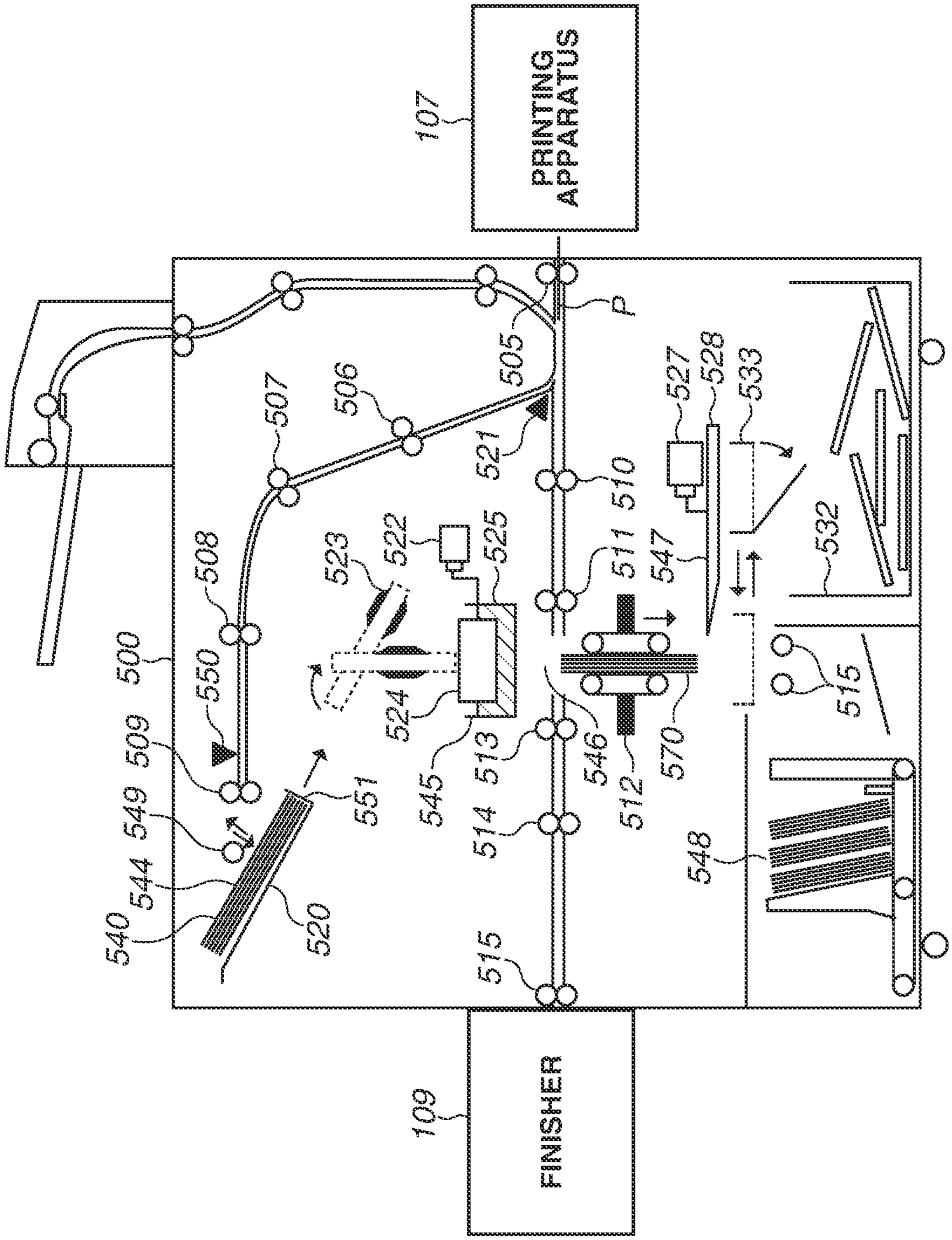
FIG. 6 is a schematic diagram illustrating a glue binding apparatus according to the present exemplary embodiment.

FIG. 6 is a schematic diagram illustrating an internal configuration of the glue binding apparatus 500 according to the present exemplary embodiment. The glue binding apparatus 500 is configured to be connectable to the printing apparatus 107 and includes the content sheet stacking unit 544, the gluing unit 545, the bonding unit 546, the cutting unit 547, and the booklet discharge unit 548.

The content sheet stacking unit 544 is a section that stacks the recording material P discharged from the printing apparatus 107 on a stacking tray 520, repeatedly accumulates them, and generates a content sheet bundle 540. The content sheet bundle 540 accumulated on the content sheet stacking unit 544 is fed to the gluing unit 545 using a gluing gripper 523.

The gluing unit 545 is a section that applies glue in a glue container 525 to the content sheet bundle 540 using a glue applying roller 524. The glue applying roller 524 is driven by a glue applying roller control motor 522 and applies glue to a lower side surface of the content sheet bundle 540.

The bonding unit 546 is a section that bonds the glued content sheet bundle 540 to the cover sheet discharged from the printing apparatus 107 and transfers it to a trim gripper 512 as a booklet 570. Then, the booklet 570 is conveyed to the cutting unit 547 by the trim gripper 512.

The cutting unit 547 is a section that cuts the booklet 570 obtained by bonding the cover sheet using a cutter 528. A cutter control motor 527 moves the cutter 528 in a horizontal direction to cut the booklet 570. A cut waste falls into a waste receiving box 533. Then, if a series of cutting operations is completed, the cut waste is collected in a waste box 532. After cutting, the booklet 570 is conveyed from the cutting unit 547 to the booklet discharge unit 548 and is discharged thereto.

The above-described flow is a series of bookbinding operations in a bookbinding mode, and according to the present exemplary embodiment, a normal discharge mode without bookbinding can be selectively performed in addition to the bookbinding mode.

A switching flapper 521 is arranged downstream of a conveyance roller pair 505. The switching flapper 521 is a diverter for selectively guiding the recording material P conveyed by the conveyance roller pair 505 to the stacking tray 520 or the finisher 109. The recording material P discharged from the printing apparatus 107 is discharged to the finisher 109 by conveyance roller pairs 505, 510, 511, 513, 514, and 515 in a normal mode. The finisher 109 can perform post-processing such as bundle discharge processing, binding processing, folding processing, hole punching processing, and saddle stitch bookbinding processing.

In the bookbinding mode, the recording material P discharged from the printing apparatus 107 is discharged to the above-described stacking tray 520 by conveyance roller pairs 506, 507, 508, and 509 and is aligned to form the content sheet bundle 540.

<Accumulation Operation of Glue Binding Apparatus>

Operations of accumulating the recording material P on the stacking tray 520 of the glue binding apparatus 500 by the content sheet stacking unit 544 in FIG. 6 is described.

In the bookbinding mode, the glue binding apparatus 500 takes the recording material P discharged from the printing apparatus 107 into the inside using the conveyance roller pair 505. Then, the recording material P is conveyed by the switching flapper 521 and the conveyance roller pairs 506, 507, 508, and 509, and an aligning roller 549 is lowered and brought into contact with the recording material P based on a signal from a sheet sensor 550 on a sheet discharge path. The aligning roller 549 can rotate forward and backward. At this time, if the aligning roller 549 is brought into contact with the recording material P while rotating, pressure due to contact and a rotational force due to rotation are applied to the recording material P. Then, a strong force is applied from the recording material P to the stacked recording material. As a result, toner transfer occurs in which a toner image formed on the recording material P is transferred to the stacked recording material. According to the present exemplary embodiment, following processing is performed to prevent toner transfer.

The recording material P is conveyed by the switching flapper 521 and the conveyance roller pairs 506, 507, 508, and 509, and the aligning roller 549 is lowered based on the signal from the sheet sensor 550 on the sheet discharge path. At this time, the aligning roller 549 is in a state where its rotation is stopped. The aligning roller 549 is brought into contact with the recording material P in the state where its rotation is stopped and then is rotated in a sheet discharge direction (clockwise direction). Thus, the recording material P is guided onto the stacking tray 520. If a trailing edge of the recording material P enters the stacking tray 520, the aligning roller 549 rotates in an opposite direction (counterclockwise direction) to convey the recording material P along the stacking tray 520 and stops when the trailing edge of the recording material P abuts on a regulating member 551. Next, if the recording material P is stacked on the stacking tray 520, the aligning roller 549 is raised and separated from the recording material P. Then, after the roller pressure on the content sheet bundle 540 is released, an alignment unit (not illustrated) aligns the content sheet bundle 540 in the width direction to a reference position in a direction perpendicular to the conveyance direction. This operation is repeated, so that the recording materials P are accumulated and formed as the content sheet bundle 540 on the stacking tray 520.

If the aligning roller 549 is brought into contact with the recording material P in a state where it is rotated, friction due to the roller is applied to the recording material P in addition to the roller contact pressure. The toner image on the back surface of the recording material P to be conveyed is transferred to the uppermost recording material P of the content sheet bundle 540 already stacked on the stacking tray 520. Thus, according to the present exemplary embodiment, the aligning roller 549 is stopped once and then brought into contact with the recording material P. Accordingly, occurrence of toner transfer can be suppressed.

<Sheet Conveyance Interval to Glue Binding Apparatus>

A sheet feeding interval (a sheet interval) for conveying the recording material P from the printing apparatus 107 to the glue binding apparatus 500 is described with reference to FIGS. 7 and 8.

First, an interval between recording materials of the same type is described with reference to FIG. 7.

A normal mode (a) in FIG. 7 illustrates a conveyance interval between recording materials in a case where the recording material is fed from the printing apparatus 107 and is conveyed as it is to the finisher 109 by the glue binding apparatus 500.

A bookbinding mode (b) in FIG. 7 illustrates a conveyance interval between recording materials in a case where the recording material is fed from the printing apparatus 107 and is subjected to glue binding processing in the glue binding apparatus 500. In a case where glue binding processing is performed, the recording material is fed from the printing apparatus 107 with the sheet feeding interval increased by a processing time required to perform stacking processing for stacking the recording material on the stacking tray 520 as described above with reference to FIG. 6. This time, it is illustrated that a difference between the normal mode (a) and the bookbinding mode (b) is 100 ms as an example, the sheet feeding interval between recording materials is different depending on the type of recording material and a post-processing mode specified by a user.

Next, an interval in a case where the type of recording material is changed is described with reference to FIG. 8.

Figure 8:
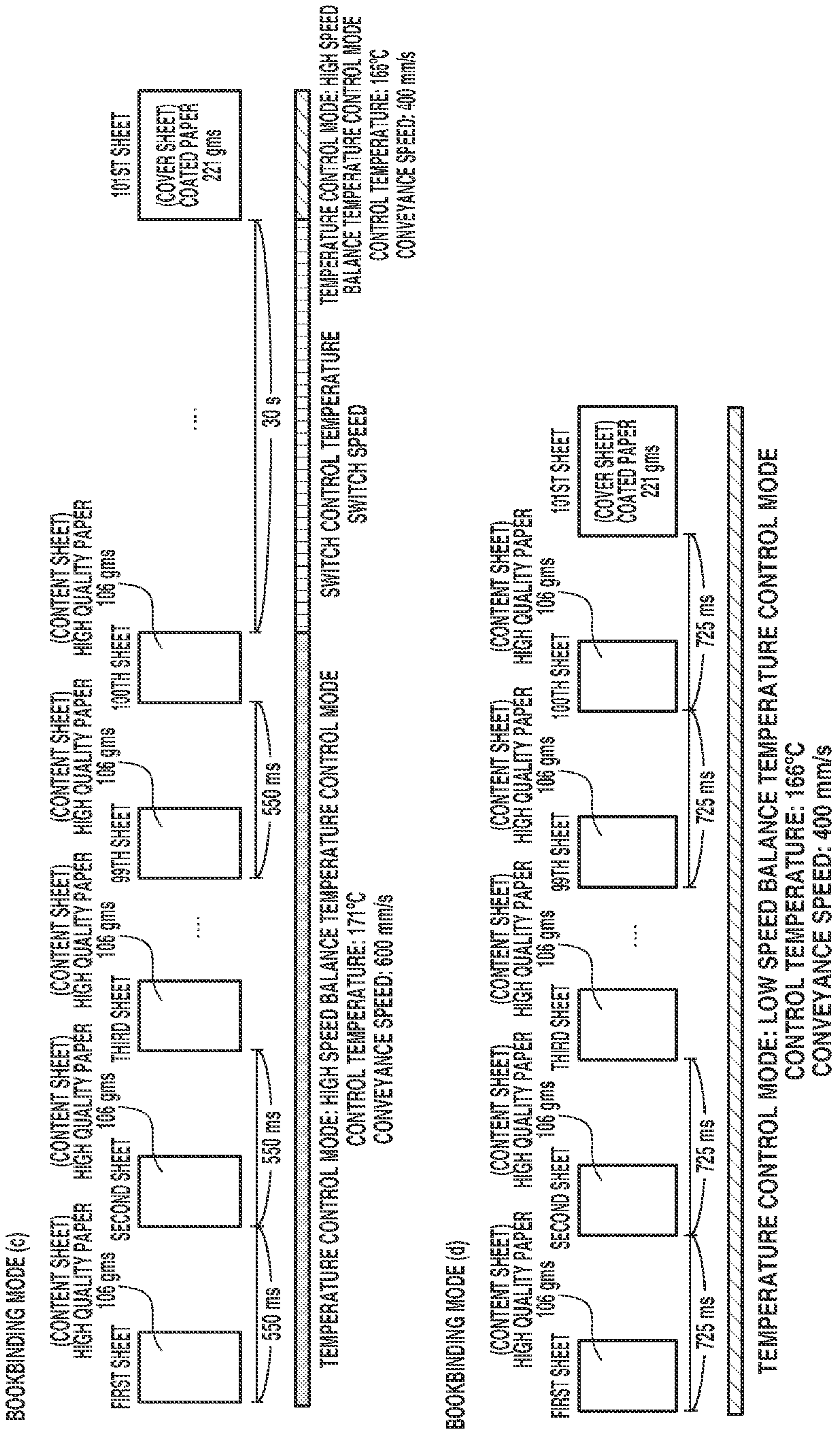
FIG. 8 illustrates temperature control modes and sheet feeding intervals in a case where paper types of a content sheet and a cover sheet are mixed in the bookbinding mode.

Bookbinding modes (c) and (d) in FIG. 8 illustrate a case where high quality paper of 106 gms is used for content sheets (first to 100th sheets) of the recording materials to be bound, and coated paper of 221 gms is used for the cover sheet (101st sheet). FIG. 8 also illustrates the sheet feeding intervals of the recording materials fed from the printing apparatus 107 to the glue binding apparatus 500.

In the bookbinding mode (c), since the content sheets (first to 100th sheets) are high quality paper of 106 gms, the temperature control mode is set to the high speed balance temperature control mode, and the sheets are conveyed at the control temperature of the fixing device 311 of 171° C. and the conveyance speed of 600 mm/s. However, the cover sheet (101st sheet) is coated paper of 221 gms and cannot be conveyed in the high speed balance temperature control mode. Thus, the temperature control mode is switched to the low speed balance temperature control mode, and the control temperature and the conveyance speed are respectively changed to 166° C. and 400 mm/s, so that a standby time of 30 seconds occurs between the 100th and 101st sheets as a time for changing the temperature control and the speed.

On the other hand, in the bookbinding mode (d), the temperature control mode of the content sheets (first to 100th sheets) is set to the low speed balance temperature control mode, and the sheets are conveyed at the control temperature of 166° C. and the conveyance speed of 400 mm/s, so that the cover sheet (101st sheet) can be conveyed at the temperature control and the speed as they are. Since the conveyance speed is reduced, the conveyance interval from the 1st to the 100th sheets is increased, but the time between the 100th and 101st sheets is 725 ms, which is shorter than 30 seconds required in the bookbinding mode (c), and accordingly the content sheet bundle 540 can be generated faster in the bookbinding mode (d).

According to the present exemplary embodiment, toner transfer is prevented by performing the operation in the bookbinding mode (d) in glue binding.

<Setting Flow for Temperature Control Mode and Conveyance Speed Corresponding to Print Job>

Figure 9:
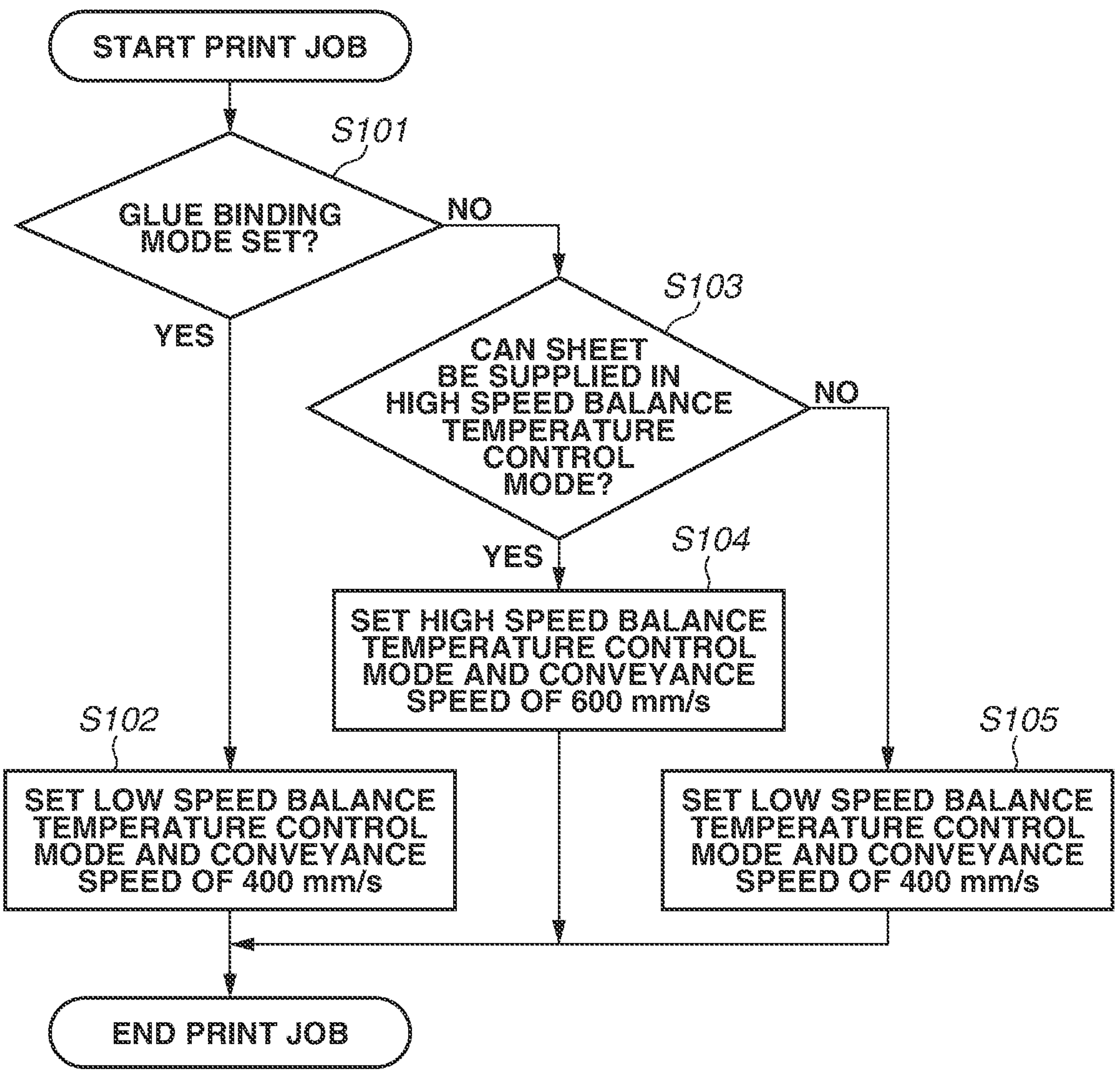
FIG. 9 is a flowchart of a first example according to the present exemplary embodiment.

FIG. 9 is a flowchart illustrating a setting flow for a temperature control mode and a conveyance speed corresponding to a print job according to the present exemplary embodiment. In this flow, in a case where a glue binding mode is selected in a print job, a temperature change time of the fixing device 311 and a conveyance time are set so that the time until binding is completed is shortened. Processing in this flow is started when the printing apparatus 107 receives an instruction to start a print job from the operation unit 224 or the client PC 103.

(Step S101)

Upon receiving an instruction to start a print job, the CPU 222 determines whether a print mode setting is set to the glue binding mode from information included in the instruction.

(Step S102)

In step S101, in a case where the glue binding mode is set (YES in step S101), the CPU 222 sets the low speed balance temperature control mode in which the conveyance speed is 400 mm/s at which the content sheets and the cover sheet for which different types of recording materials are used can be conveyed and a fixing temperature difference for each basis weight is minimized.

(Step S103)

In step S101, in a case where the glue binding mode is not set (NO in step S101), the CPU 222 determines whether the sheet can be fed in the high speed balance temperature control mode from the information, such as the basis weight and the type of the recording material, included in the start instruction of the print job.

(Step S104)

In step S103, in a case where it is determined that the sheet can be fed in the high speed balance temperature control mode (YES in step S103), the CPU 222 sets the high speed balance temperature control mode in which the conveyance speed is 600 mm/s.

(Step S105)

In step S103, in a case where it is determined that the sheet cannot be fed in the high speed balance temperature control mode (NO in step S103), the CPU 222 sets the low speed balance temperature control mode in which the conveyance speed is 400 mm/s.

The image forming apparatus 101 conveys the recording material to the glue binding apparatus 500 using the fixing operation set according to the above-described flow.

According to the present exemplary embodiment, the low speed balance temperature control mode is set in a case of a print job for performing glue binding as described above, so that it is possible to reduce a time required to switch the conveyance speed and the fixing temperature for the content sheets and the cover sheet using different types of recording materials, and to suppress reduction in productivity. Further, it is possible to suppress toner transfer in the case of performing glue binding.

The sheet interval may refer to a distance between a predetermined recording material and a next subsequent recording material.

Figure 10:
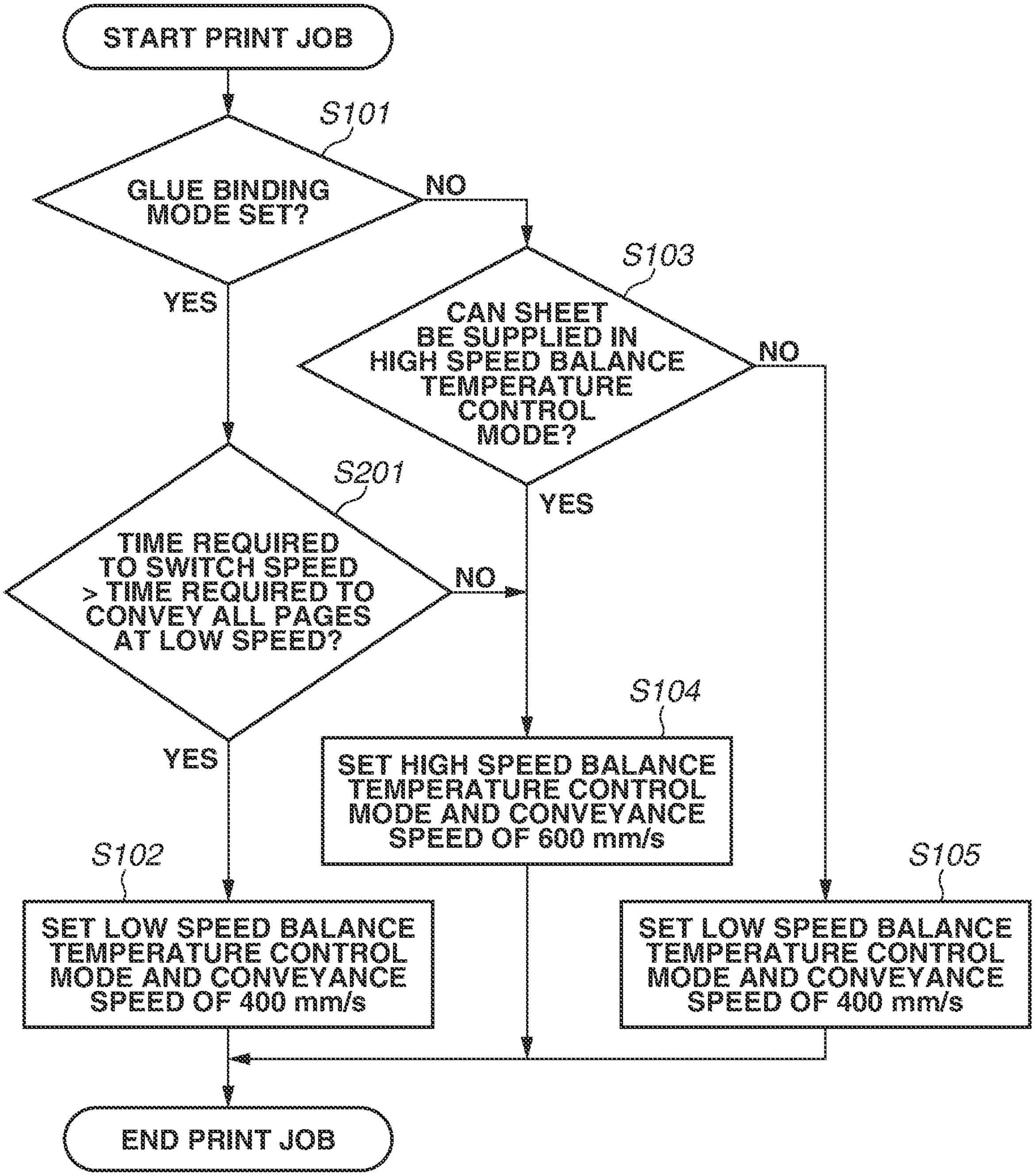
FIG. 10 is a flowchart of a second example according to the present exemplary embodiment.

Setting Flow for Temperature Control Mode and Conveyance Speed for Determining Productivity in Addition to First Example FIG. 10 is a flowchart for determining productivity according to the conveyance speed in addition to the first example. A setting is performed by taking into account the time required to switch the conveyance speed and the fixing temperature and an increase in time required for conveying at a low speed instead of a high speed.

(Step S101)

Upon receiving an instruction to start a print job, the CPU 222 determines whether the print mode setting is set to the glue binding mode from information included in the instruction.

(Step S201)

In step S101, in a case where the glue binding mode is set (YES in step S101), the CPU 222 compares the time required to switch the fixing speed with a difference between the time required to convey all pages of the booklet 570 at a high speed and at a low speed. In a case where the time required to switch the fixing speed is longer (YES in step S201), the processing proceeds to step S102. In a case where the time required to convey all pages at a high speed is shorter (NO in step S201), the processing proceeds to step S104.

(Step S102)

The CPU 222 sets the low speed balance temperature control mode in which the conveyance speed is 400 mm/s at which the content sheets and the cover sheet for which different types of recording materials are used can be conveyed and the fixing temperature difference for each basis weight is minimized.

(Step S103)

In step S101, in a case where the glue binding mode is not set (NO in step S101), the CPU 222 determines whether the sheet can be fed in the high speed balance temperature control mode from the information, such as the basis weight and the type of the recording material, included in the start instruction of the print job.

(Step S104)

In step S103, in a case where it is determined that the sheet can be fed in the high speed balance temperature control mode (YES in step S103) or in step S201, in a case where the time required to convey all pages at a high speed is shorter (NO in step S201), the CPU 222 sets the high speed balance temperature control mode in which the conveyance speed is 600 mm/s.

(Step S105)

In step S103, in a case where it is determined that the sheet cannot be fed in the high speed balance temperature control mode (NO in step S103), the CPU 222 sets the low speed balance temperature control mode in which the conveyance speed is 400 mm/s.

The image forming apparatus 101 conveys the recording material to the glue binding apparatus 500 using the fixing operation set according to the above-described flow. In a case where it is determined as NO in step S201, and the cover sheet is not the recording material that can be fed in the high speed balance temperature control mode, the fixing speed is switched as in a conventional method.

As described above, according to the present exemplary embodiment, in a case where productivity is high in feeding a sheet at a low speed even if the fixing speed switching time is taken into account in a print job for performing glue binding, the low speed balance temperature control mode is set. Accordingly, it is possible to reduce a time required to switch the conveyance speed and the fixing temperature for the content sheets and the cover sheet using different types of recording materials, and to suppress reduction in productivity.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-003522, filed Jan. 13, 2023, which is hereby incorporated by reference herein in its entirety.

What is claimed is:

1. An image forming apparatus connectable to a processing apparatus capable of performing glue binding, the glue binding being binding processing performed by gluing a cover sheet and content sheets and wrapping the content sheets with the cover sheet, the image forming apparatus comprising:

an image forming portion configured to form a toner image on a recording material;

a fixing unit configured to form a nip portion and fix the toner image formed by the image forming portion to the recording material; and a speed control unit configured to control a conveyance speed of the recording material in the nip portion, wherein the speed control unit is configured to, based on first information as to whether the glue binding is performed on the recording material by the processing apparatus or not, control the conveyance speed of the recording material in the nip portion, wherein, in a case where, based on the first information, the glue binding is performed for an image forming job of performing image forming on a first recording material having a first basis weight and a second recording material having a second basis weight heavier than the first basis weight, the speed control unit sets the conveyance speed of the recording material at a time when the first recording material and the second recording material pass through the nip portion to a first speed lower than a second speed, irrespective of second information regarding the image forming job, and wherein, in a case where, based on the first information, the glue binding is not performed for the image forming job, the speed control unit is able to determine whether the conveyance speed of the recording material at the time when the first recording material and the second recording material pass through the nip portion is the first speed or the second speed, based on the second information regarding the image forming job.

2. The image forming apparatus according to claim 1, further comprising an operation unit via which a user is able to manually input the first information as to whether the glue binding is performed on the recording material by the processing apparatus or not.

3. An image forming system including the image forming apparatus according to claim 1, further comprising an external controller via which a user is able to input the first information as to whether the glue binding is performed on the recording material by the processing apparatus or not, wherein the glue binding is set from the external controller.

4. An image forming system including the image forming apparatus according to claim 1, further comprising the processing apparatus configured to perform the glue binding.

5. The image forming system according to claim 4, wherein the processing apparatus includes a stacking unit configured to stack the content sheet and a roller configured to abut on and separate from the content sheet stacked on the stacking unit.

6. The image forming system according to claim 5, wherein the roller is driven to rotate and is brought into contact with the content sheet stacked on the stacking unit in a state where rotation of the roller is stopped.

* * * * *